3,472,686
**METHOD OF MAKING COATED ARC
WELDING ELECTRODES**
Lars Hilding Hillert, Goteborg, Sweden, assignor to
 Elektriska Svetsningsaktiebolaget, Goteborg, Sweden, a corporation of Sweden
No Drawing. Filed Sept. 7, 1965, Ser. No. 485,587
Claims priority, application Sweden, Sept. 7, 1964,
10,696/64
Int. Cl. H01b *1/08;* B23k *35/00*
U.S. Cl. 117—205                                                 14 Claims

ABSTRACT OF THE DISCLOSURE

In the method of making coated arc welding electrodes in which a coating composition is extruded onto massive or tubular wires or rods of iron or steel, the steps of preparing a coating composition including a minor proportion of at least one inorganic constituent having a melting point between 150° C. and 600° C. and a major proportion of higher melting inorganic constituents, heating said mixture to a temperature causing fusion of said at least one low melting constituent only, and extruding the heated mixture onto the wires or rods. The welding wire or welding rod produced by the method comprises a massive or tubular wire or rod of iron or steel and an extruded coating thereon, the coating being composed of grains or granules of inorganic material embedded in and bonded by a solidified matrix consisting of boric oxide or of at least one chromium oxide.

---

This invention relates to a method of making coated arc welding electrodes by the extrusion of a coating composition about a wire or rod of iron or steel. Said wire or rod may be massive, or it may consist of a tube or sheath enclosing a filling or core of metal powder with or without additions of fluxing agents, deoxidizing agents etc.

In a well-known electrode making process the powdered coating constituents are mixed with potassium or sodium silicate solution to the consistency of a paste. The silicate solution provides an effective bond as the electrodes are dried after the extrusion. The use of an alkali silicate binder has, however, the disadvantage that the dried coating is apt to reabsorb humidity out of the atmospheric air. Moreover, the silicon content of the alkali silicate is metallurgically undesirable in some kinds of electrodes, as some elemental silicon may be reduced out of the slag and enter the weld metal. This danger can be avoided by the use of organic binders, for instance dextrine, which, however, have other disadvantages. The alkali content of the alkali silicate may also be undesirable, for instance when it is desired to keep the content of electron emitting agents of the coating down to a minimum. It has been suggested to employ a low melting, hydrophobic water-insoluble glass frit as a binder for electrode coatings. The powdered coating composition containing a proportion of the frit is mixed with water and extruded onto wire cores in the usual way; after drying, the electrodes are fired at a temperature sufficient to soften the glass frit and cause it to wet and adhere to the particles of the other flux ingredients.

The method according to the invention comprises the steps of preparing a coating composition including a minor proportion of at least one inorganic constituent having a melting point between 150° and 600° C., heating said mixture to a temperature at least equal to the melting point of said constituent, and extruding the heated mixture onto the wires or rods. On solidifying, the inorganic constituent bonds the particles of the coating to each other and to the electrode.

This method eliminates the usual drying of the extruded electrodes. This is a valuable advantage from a manufacturing viewpoint. Moreover, the coatings are less porous than coatings which have been submitted to drying in order to remove water, and therefore are less apt to absorb moisture from the atmosphere.

The coating composition does not necessarily have to be compounded of anhydrous constituents. Indeed, some water may be added in order to facilitate the desired uniform distribution of the fusible constituent in the mixture. The water has to be removed prior to the extrusion. The heating of the mixture to the temperature required for the extrusion is preferably carried out in a special furnace from which the hot mass is transferred to the extrusion press. As in the ordinary electrode making method, it is for practical reasons preferable to compress the mass, prior to its introduction into the extrusion press, into a compact cylindrical body having a size suited to the extrusion press. Said preliminary compression or compacting of the mass can be carried out before or after the mixture is heated to the extrusion temperature. The extrusion press should preferably be provided with a heating device by means of which the mass may be kept at contant temperature. In some cases it may be necessary or advisable to preheat the electrode core prior to its introduction into the press, in order to prevent cooling of the mass in the extrusion nozzle or to prevent too large a temperature difference between the core wire and the coating which might cause cracking of the coating. Usually, however, no such preheating is required. It may also be necessary or advisable to make provision for a controlled, not too high cooling rate, for instance by conveying the electrodes through a cooling tunnel in which the temperature slowly falls towards the exit end.

The composition of the solidified melt bonding the particles of the finished coating does not necessarily have to be identical with the composition of the fusible constituent of the original mixture. The fusible constituent may be able to react at elevated temperatures with one or more of the other constituents of the coating to form a reaction product or reaction products the melting points of which exceed the one of the fusible constituent. It is within the invention to further such reactions by maintaining the extruded electrodes at an elevated temperature, which may or may not exceed the extrusion temperature, for a period sufficient to convert at least a substantial part of the fusible constituent into solid reaction products. Furthermore, the fusible constituent may be thermally decomposable at temperatures substantially exceeding its melting point, the decomposition yielding a solid decomposition product. It is within the invention to bring about such a decomposition by the step of heating the coated electrodes to a temperature sufficient to cause the decomposition of at least a substantial part of the fusible constituent.

The proportion of the fusible constituent of the coating compound should be chosen with due regard to the grain size distribution of the compound as well as to various chemical and metallurgical factors. The chemical composition of the fusible constituent or the resulting solid bonding agent is, of course, one of said factors. It is, therefore, not possible to state a general or universally applicable rule for choosing the proportion of the fusible inorganic constituent. However, the experience now available seems to indicate that proportions below 2% yield no satisfactory bond, while on the other hand raising the proportion of the inorganic constituent above 10% yields no corresponding improvement of the bonding action or the strength of the coating. The invention is not, however, limited to the use of a proportion within the range of 2–10%; for instance, it might be advantageous for metallurgical reasons to employ a proportion of the fusible inorganic agent above 10%, for instance 30%. If it is desired to reduce the humidity absorption of the coating as far as possible, the proportion of the fusible constituent and/or the grain size distribution of the part of the coating compound which remains solid throughout the manufacture of the electrodes should be chosen in such a way that the melt completely fills the interstices between the solid grains, whereby the coating on cooling forms a massive, non-porous body.

Boric oxide ($B_2O_3$) and chromium trioxide ($CrO_3$) are examples of fusible inorganic compounds suitable for the method according to the invention. Neither of said compounds necessarily have to be supplied in the anhydrous state; thus, part or all of the boric oxide may be supplied in the form of boric acid, and part or all of the chromium trioxide may be supplied in the form of solid chromic acid, or in the form of an aqueous solution of $CrO_3$. The melting point of the boric oxide is usually given as 450° C.; in fact, however, said compound in its usual state exhibits no sharp transition from the solid to the liquid state, or vice versa, but rather a gradual change of viscosity with temperature. In using said compound in the method according to the invention, the temperature and the duration of the heat treatment have to be chosen in such a way as to cause the boric oxide thoroughly to wet and surround the solid grains of the powder composition, so that the boric oxide on cooling will provide a strong bond between the grains. A temperature in the range between 450° and 550° C. is suitable. The preferred heating temperature is about 500° C. The boric oxide present in the finished coating serves not only as a bonding agent, but also as a fluxing agent in the welding process.

Chromium trioxide melts at 196° C. and is stable up to about 250° C. At temperatures exceeding 250° C., the trioxide is decomposed into lower oxides and oxygen. At temperatures from about 415° C. and upwards, only the oxide $Cr_2O_3$ is stable. In the method according to the invention, the coating mixture containing chromium trioxide is suitably heated to a temperature in the range between 200° and 250° C., preferably to about 220° C. The electrodes may be allowed to cool directly on extrusion, in which case the bonding agent present in the finished coating will consist of the solidified chromium trioxide. It is, however, also within the invention to submit the extruded electrodes to a heat treatment at higher temperatures, preferably not less than about 415° C., so that the chromium trioxide is converted into chromium oxide ($Cr_2O_3$), which is unsoluble in water and chemically inert at ordinary temperatures. It is also possible and within the invention to choose the composition of the coating compound in such a way that at least one constituent thereof is capable of reacting with the chromium trioxide to form a new compound, more particularly a chromate, dichromate or chromite. Examples of such constituents are copper oxide (cupric oxide or cuprous oxide) and alkaline earth metal oxides or carbonates. To effect the desired reaction the electrodes, preferably immediately after the extrusion, are submitted to a heat treatment at such a temperature and during such a time that at least a substantial part of the chromium trioxide (or of the thermal decomposition products of the chromium trioxide) are caused to react with the other reactive constituent or constituents.

Both chromium trioxide and boric oxide offer the particular advantage that they permit the manufacture of electrode coatings which in contradistinction to coatings containing alkali silicate contain neither silica nor alkali.

The following specific examples of the electrode making process according to the invention are given for the purpose of illustration only and are not intended to limit the scope of the invention. The proportions are by weight.

EXAMPLE 1

The following powdered constituents are mixed in the dry state.

| | Percent |
|---|---|
| Calcium carbonate | 18 |
| Titanium dioxide | 14 |
| Felspar | 12 |
| Iron powder | 36 |
| Ferromanganese | 11 |
| Boric acid ($H_3BO_3$) | 9 |
| | 100 |

After the addition of a small proportion of water, the mixture is compressed into a massive cylinder having a diameter of 20 centimeters. Said cylinder is heated to 525° C. in a furnace. The heated cylinder is charged into a preheated electrode press and extruded through a nozzle of 5.6 mm. diameter onto wire rods of mild steels of 4 mm. diameter.

EXAMPLE 2

The following powdered constituents are mixed in the dry state:

| | Percent |
|---|---|
| Felspar | 60 |
| Calcium oxide | 20 |
| Chromite ore | 10 |
| Silicon | 5 |
| Chromium trioxide | 5 |
| | 100 |

The mixture is heated to about 200° C. and compressed at said temperature into a massive cylinder of 20 cm. diameter. This compressed body is subsequently heated to about 250° C., charged into a preheated electrode press, and extruded through a nozzle of 4.5 mm. diameter onto wire rods of 3.25 mm. diameter having the following composition:

| | Percent |
|---|---|
| C | 0.12 |
| Si | 0.10 |
| Mn | 1.7 |
| Cr | 0.3 |
| Ni | 2.5 |
| Mo | 0.5 | remainder iron with or without usual contaminations.

If desired, the extruded electrodes may be heated in a furnace to about 440° C., whereby the molten chromium trioxide is converted into solid compounds and the finished coating contains no chromium trioxide.

EXAMPLE 3

A mixture of the following powdered constituents:

| | Percent |
|---|---|
| $CaCO_3$ | 40 |
| $CaF_2$ | 24 |
| FeTi (25% Ti) | 10 |
| FeNb | 20 |
| $CrO_3$ | 6 |
| | 100 | is extruded as described in Example 2 onto core wires consisting of a tubular sheath of mild steel enclosing a core of chromium and nickel powder. The proportions are such that the sheath and the powder core together have the composition of a chromium nickel steel containing 25% of chromium, 25% of nickel and 0.15% of carbon. The outer diameter of the tubular sheath is 4 mm., and the extrusion nozzle has a diameter of 6.4 mm.

The invention may also be applied to the manufacture of long wire electrodes for automatic welding supplied in the form of coils. Such electrodes may, for instance, have a coating of the wire-sheathed type (that is, with one or more wires flyspun around a core wire, the spaces being filled with flux). It is also possible to apply the invention to the manufacture of electrodes the coating of which consists of two or more portions having dissimilar compositions, for instance electrodes having a coating comprising two concentric layers, at least one of which is made by the method according to the invention. Both layers may be extruded simultaneously, as known per se.

I claim:

1. In the method of making coated arc welding electrodes in which a coating composition is extruded onto massive or tubular wires or rods of iron or steel, the steps of preparing a coating composition including a minor proportion of at least one low melting inorganic constituent selected from the group consisting of boric oxide and chromium trioxide having a melting point between 150° C. and 600° C., and a major proportion of higher melting inorganic constituents, heating said mixture to a temperature to cause fusion of said at least one low melting constituent only, and extruding the heated mixture onto the wires or rods.

2. In the method of making coated arc welding electrodes in which a coating composition is extruded onto massive or tubular wires or rods of iron or steel, the steps of preparing an anhydrous coating composition including a minor proportion of at least one low melting inorganic constituent selected from the group consisting of boric oxide and chromium trioxide having a melting point between 150° C. and 600° C. and a major proportion of higher melting inorganic constituents, heating said mixture to a temperature causing fusion of said at least one low melting constituent only, and extruding the heated mixture onto the wires or rods.

3. In the method of making arc welding electrodes in which a coating composition is extruded onto massive or tubular wires or rods or iron or steel, the steps of preparing a coating composition including a minor proportion of at least one low melting inorganic constituent selected from the group consisting of boric oxide and chromium trioxide having a melting point between 150° C. and 600° C. and a major proportion of higher melting inorganic constituents, said coating composition also including a proportion of free or bound water, heating said mixture so as to vaporize substantially all of the water and to cause fusion of said at least one low-melting inorganic constituent only, and extruding the heated mixture onto the wires or rods.

4. In the method of making coated arc welding electrodes in which a coating composition is extruded onto massive or tubular wires or rods of iron or steel, the steps of preparing a coating composition including a minor proportion of at least one low melting inorganic constituent selected from the group consisting of boric oxide and chromium trioxide having a melting point between 150° C. and 600° C. and a major proportion of higher melting inorganic constituents, heating said mixture to a temperature at least equal to the melting point of said constituent but not exceeding 600° C. whereby said low melting inorganic constituent but not said higher melting inorganic constituent is fused, and extruding the heated mixture onto the wires or rods.

5. In the method of making coated arc welding electrodes in which a coating composition is extruded onto massive or tubular wires or rods of the iron or steel, the steps of preparing a coating composition including a minor proportion of at least one inorganic constituent selected from the group consisting of boric oxide and chromium trioxide having a melting point between 150° C. and 600° C. and a major proportion of higher melting inorganic constituents including an inorganic constituent capable of reacting with said first-mentioned, low-melting inorganic constituent at elevated temperatures to form a reaction product the melting point of which exceeds the one of said low-melting inorganic constituent, heating said mixture to a temperature to cause fusion of said low-melting inorganic constituent only, extruding the heated mixture onto the wires or rods, and subjecting the coated electrode to a heat treatment at such a temperature and for such a period that at least a substantial part of the fused constituent is converted into solid reaction products by reacting with said reactable inorganic constituent.

6. In the method of making coated arc welding electrodes in which a coating composition is extruded onto massive or tubular wires or rods of iron or steel, the steps of preparing a coating composition including a minor proportion of at least one low melting inorganic constituent selected from the group consisting of boric oxide and chromium trioxide having a melting point between 150° C. and 600° C. and a major proportion of higher melting inorganic constituents, said low melting inorganic constituent being thermally decomposable at temperatures substantially exceeding its melting point, heating said mixture to a temperature at least equal to the melting point of said constituent but not sufficient to cause decomposition of said constituent nor to cause melting of said higher melting inorganic constituents, extruding the heated mixture onto the wires or rods, and heating the coated electrodes to a temperature causing decomposition of at least a substantial part of said low-melting constituent.

7. In the method of making coated arc welding electrodes in which a coating composition is extruded onto massive or tubular wires or rods of iron or steel, the steps of preparing a coating composition including a minor proportion of boric oxide and a major proportion of higher melting inorganic constituents, heating said mixture to a temperature exceeding 450° C. but not exceeding 600° C. whereby the boric oxide but not the higher melting inorganic constituent is fused, and extruding the heated mixture onto the wires or rods.

8. In the method of making coated arc welding electrodes in which a coating composition is extruded onto massive or tubular wires or rods of iron or steel, the steps of preparing a coating composition including a minor proportion of boric acid and a major proportion of higher melting inorganic constituents, heating said mixture to a temperature exceeding 450° C. but not exceeding 600° C., whereby the water of the boric acid is evaporated and the remaining boric oxide is fused, while the higher melting inorganic constituents remain in the solid state, and extruding the heated mixture onto the wires or rods.

9. In the method of making coated arc welding electrodes in which a coating composition is extruded onto massive or tubular wires or rods of iron or steel, the steps of preparing a coating composition including a minor proportion of chromium trioxide and a major proportion of higher melting inorganic constituents, heating said mixture to a temperature not lower than 196° C. but not exceeding 250° C., whereby the chromium trioxide but not the higher melting inorganic constituents is fused and extruding the heated mixture onto the wires or rods.

10. A method as claimed in claim 9, which comprises the further step of heating the coated electrodes to a temperature exceeding 250° C., whereby the chromium trioxide is at least partially converted into lower oxides.

11. A method as claimed in claim 9 which comprises the further step of heating the coated electrodes to a temperature of at least 415° C., preferably not exceeding 450° C., whereby the chromium trioxide is converted into chromium oxide ($Cr_2O_3$).

12. A method as claimed in claim 1 in which the low-melting inorganic constituent is supplied in a proportion of 2 to 10% by weight of the coating composition.

13. A welding wire or welding rod comprising a massive or tubular wire or rod of iron and steel and an extruded coating thereon, said coating being composed of grains or granules of inorganic materials embedded in and bonded by a solidified matrix consisting of at least one chromium oxide.

14. A welding wire or welding rod comprising a massive or tubular wire or rod of iron and steel and an extruded coating thereon, said coating being composed of grains or granules of inorganic materials embedded in and bonded by a solidified matrix consisting of boric oxide.

References Cited
UNITED STATES PATENTS

| | | | |
|---|---|---|---|
| 1,872,320 | 8/1932 | Mino et al. | 117—202 |
| 2,118,680 | 5/1938 | Lytle | 117—202 |
| 2,751,478 | 6/1956 | Jackson et al. | 148—126 |
| 2,807,562 | 9/1957 | Shrubsall | 148—126 |

WILLIAM L. JARVIS, Primary Examiner

U.S. Cl. X.R.

117—206, 207; 148—26; 219—146; 264—209, 211